United States Patent
Jonsson et al.

(10) Patent No.: US 9,313,318 B2
(45) Date of Patent: Apr. 12, 2016

(54) ADAPTIVE MEDIA OBJECT REPRODUCTION BASED ON SOCIAL CONTEXT

(75) Inventors: Hakan Jonsson, Hjarup (SE); Andreas Kristensson, Malmo (SE); Anders Isberg, Akarp (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 235 days.

(21) Appl. No.: 13/127,341

(22) PCT Filed: May 26, 2010

(86) PCT No.: PCT/IB2010/001249
§ 371 (c)(1),
(2), (4) Date: May 3, 2011

(87) PCT Pub. No.: WO2011/148213
PCT Pub. Date: Dec. 1, 2011

(65) Prior Publication Data
US 2011/0309946 A1    Dec. 22, 2011

(51) Int. Cl.
| G08B 21/00 | (2006.01) |
| H04M 1/725 | (2006.01) |
| H04W 4/00 | (2009.01) |
| G06F 21/84 | (2013.01) |
| G06F 17/30 | (2006.01) |

(52) U.S. Cl.
CPC ..... *H04M 1/72563* (2013.01); *G06F 17/30793* (2013.01); *G06F 21/84* (2013.01); *H04W 4/008* (2013.01)

(58) Field of Classification Search
USPC ........................................ 340/686.6
See application file for complete search history.

(56) References Cited

U.S. PATENT DOCUMENTS

| 8,154,615 | B2* | 4/2012 | Fedorovskaya | G06Q 30/02 348/222.1 |
| 8,233,919 | B2* | 7/2012 | Haag | G06Q 50/26 340/539.13 |
| 2004/0120552 | A1 | 6/2004 | Borngraber et al. | |
| 2005/0096084 | A1* | 5/2005 | Pohja | G06F 17/30038 455/556.1 |
| 2006/0170669 | A1* | 8/2006 | Walker | G06F 3/0362 345/418 |

(Continued)

OTHER PUBLICATIONS

International Search Report and Written Opinion from corresponding International Application No. PCT/IB2010/001249 mailed Dec. 28, 2010.

(Continued)

*Primary Examiner* — Naomi Small
(74) *Attorney, Agent, or Firm* — Renner, Otto, Boisselle & Sklar, LLP

(57) ABSTRACT

A media-reproduction device for adaptively reproducing media objects based upon social context of one or more people in proximity to the media-reproduction device is disclosed. The media-reproduction device includes an output device for reproducing a media object and a control circuit. The control circuit is configured to identify a person in proximity to the media-reproduction device and to determine a social context based upon an analysis of social data corresponding to the identified person. The control circuit select at least one media object for reproduction on the output device based upon the social context and then reproduce the at least one media object on the output device. The media objects selected and reproduced on the output device can be adapted based upon changes in the social context.

17 Claims, 3 Drawing Sheets

(56) References Cited

U.S. PATENT DOCUMENTS

| | | | | |
|---|---|---|---|---|
| 2006/0192862 A1* | 8/2006 | Ono | .................... | G11B 27/034 |
| | | | | 348/231.5 |
| 2006/0220787 A1* | 10/2006 | Turner | ............... | G07C 9/00087 |
| | | | | 340/5.61 |
| 2009/0138805 A1* | 5/2009 | Hildreth | ............ | G06K 9/00335 |
| | | | | 715/745 |
| 2009/0310028 A1* | 12/2009 | Sadri | .................. | H04N 1/00204 |
| | | | | 348/718 |
| 2010/0206949 A1* | 8/2010 | Mattlin | .................. | G06K 17/00 |
| | | | | 235/375 |
| 2011/0050564 A1* | 3/2011 | Alberth | ................... | G06F 3/147 |
| | | | | 345/156 |
| 2011/0134026 A1* | 6/2011 | Kang | ..................... | G06F 3/011 |
| | | | | 345/156 |
| 2011/0143775 A1* | 6/2011 | Liu | ................... | G06F 17/30241 |
| | | | | 455/456.3 |

OTHER PUBLICATIONS

International Preliminary Report on Patentability for corresponding International Application No. PCT/IB2010/001249 dated Dec. 6, 2012.

* cited by examiner

ADAPTIVE MEDIA OBJECT REPRODUCTION BASED ON SOCIAL CONTEXT

This application is a national phase of International Application No. PCT/IB2010/001249 filed May 26, 2010 and to be published in the English language.

TECHNICAL FIELD OF THE INVENTION

The technology of the present disclosure relates generally to electronic devices and, more particularly, to a media-reproduction device for adaptively reproducing media objects based upon social context within proximity to the device.

BACKGROUND

Digital media objects, such as digital photos, videos and the like, can be reproduced on a media-reproduction device such as a digital photo frame. For example, the media objects can be reproduced as part of a slideshow presentation on the display of the digital photo frame.

The content of the slideshow (e.g., the media objects) can be stored in the internal memory of the media-reproduction device and/or externally on a memory card or a personal computer having a user-specified file folder(s) containing the selected media objects for reproduction on the device.

In order to change the content of the slideshow, a user typically must manually add/remove files from the internal memory of the device, the memory card and/or the user-specified file folder(s) on the personal computer. Such manual manipulation of the content can be tedious and time consuming, especially in situations in which a person would like to change the content of the slideshow frequently or modify the content based upon the people who will be viewing the slideshow.

SUMMARY

The present invention provides a media-reproduction device for reproducing media objects based upon social context within proximity to the media-reproduction device. The social context can be determined by an analysis of the identity of each person in proximity to the device, their relationships with other people and/or characteristics of the surrounding environment. The media objects that are selected and reproduced by the media-reproduction device can be automatically selected to adaptively produce a slideshow or other reproduction of media objects that is relevant to the people by which it will be seen.

The media-reproduction device also can detect changes in the social context (e.g., changes in the people and/or characteristics of the surrounding environment) and, based upon the new social context, select different media objects for reproduction. The media-reproduction device can therefore adapt the media reproduction such that the reproduced media remains relevant despite changes in the social context of the people around the device.

In one embodiment, the media objects can be retrieved from the internet, for example, from websites such as Facebook, LinkedIn, Twitter, Flicker, MySpace, Google, Picasa, and the like. By obtaining the media objects from the internet, the media-reproduction device can reproduce media objects that are not otherwise easily accessible for manual addition to the device, thereby automating and simplifying the personalization of the reproduced media objects.

Rather than simply reproducing media objects that have been manually added to the memory of the device, a memory card, or to a user-specified file folder, the media objects reproduced on the device described herein can be adapted dynamically and without manual user intervention. The adaptive selection of media objects also maintains the relevancy of the reproduced media objects as the social context changes so as to keep the media reproduction relevant to the people in proximity to the media-reproduction device. The media-reproduction device described herein therefore enhances the viewing experience of those people in proximity to the device.

According to one aspect, a media-reproduction device for adaptively reproducing media objects based upon social context within proximity to the media-reproduction device include an output device for reproducing a media object and a control circuit. The control circuit is configured to identify a person in proximity to the media-reproduction device, determine a social context based upon an analysis of social data corresponding to the identified person, select at least one media object for reproduction on the output device based upon the determined social context, and reproduce the at least one media object on the output device.

According to another aspect, the control circuit is further configured to identify at least one additional person in proximity to the media-reproduction device, and to determine the social context based upon the analysis of the social data of each identified person.

According to another aspect, the social context is based upon a determination of the relationship between at least one identified person and at least one other identified person.

According to another aspect of the media-reproduction device, the at least one media object is selected based upon social data that the identified people have in common with each other.

According to another aspect, the media-reproduction device of claim 2, wherein the at least one media object is selected based upon social data that the identified people do not have in common with each other.

According to another aspect, the media-reproduction device includes a camera and a recognition function for processing an image obtained by the camera, wherein the control circuit is configured to identify the person in proximity to the media-reproduction device by facial recognition.

According to another aspect, the determination of the social context is based upon a gesture detected by the camera.

According to another aspect, the media-reproduction device, further includes a microphone for detecting audio in proximity to the media-rendering device, and the determination of the social context is based upon the detected audio.

According to another aspect, the audio includes vocal content from the person in proximity to the media-rendering device, and the recognition function processes the vocal content to identify the at least one person in proximity to the media-reproduction device by voice recognition.

According to another aspect, the recognition function extracts and analyzes at least one keyword from the audio content to determine the social context.

According to another aspect, the at least one media object is selected based upon the at least one keyword.

According to another aspect, the media-reproduction device includes a short-range radio module configured to scan for short range radio devices, and the control circuit identifies the person in proximity to the media-reproduction device by detecting a short range radio device associated with the person.

According to another aspect, the media-reproduction device includes an interface for communication with a remote source to obtain the social data related to the person in proximity to the media-rendering device.

According to another aspect, the person in proximity to the media-reproduction device is identified from a presence service accessible to the media-reproduction device via an internet connection through the interface.

According to another aspect, the media object is obtained from a remote database accessible to the media-reproduction device through the interface.

According to another aspect, the social data includes a corresponding profile for each identified person, the profile including restrictions regarding the media objects available for reproduction on the media-reproduction device based upon the social context.

According to another aspect, the control circuit is configured to adapt the social context based upon changes in the social data.

According to another aspect, the social context includes a determination of a mood of the identified person, and the media object is selected based upon the mood.

According to another aspect, the control circuit is configured to select the at least one media object by searching a source of media objects for media objects that are related to the determined social context.

According to another aspect, the control circuit is configured to select at least one additional media object for reproduction based upon the determined social context, and to reproduce the selected media objects on the output device.

According to another aspect, a method of adaptively reproducing media objects on a media-reproduction device includes identifying a person in proximity to the media-reproduction device, determining a social context based upon the analysis of social data corresponding to the identified person, selecting at least one media object for reproduction on an output device based upon the determined social context, and reproducing the at least one media object on the output device.

According to another aspect, the method includes determining whether the social context has changed, and adapting the selection of at least one media object based upon the change in the social context.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 2:
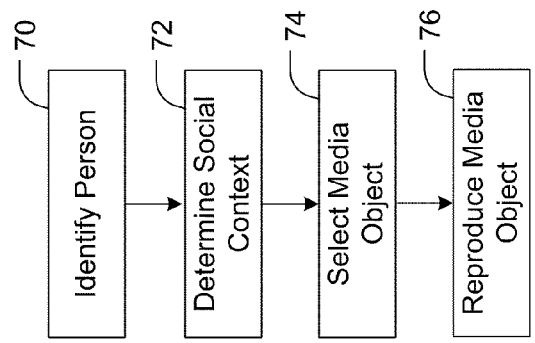
FIG. 2 is a flow chart representing an exemplary method of adaptively reproducing media objects based upon social context.

Embodiments will now be described with reference to the drawings, wherein like reference numerals are used to refer to like elements throughout. It will be understood that the figures are not necessarily to scale.

Figure 3:
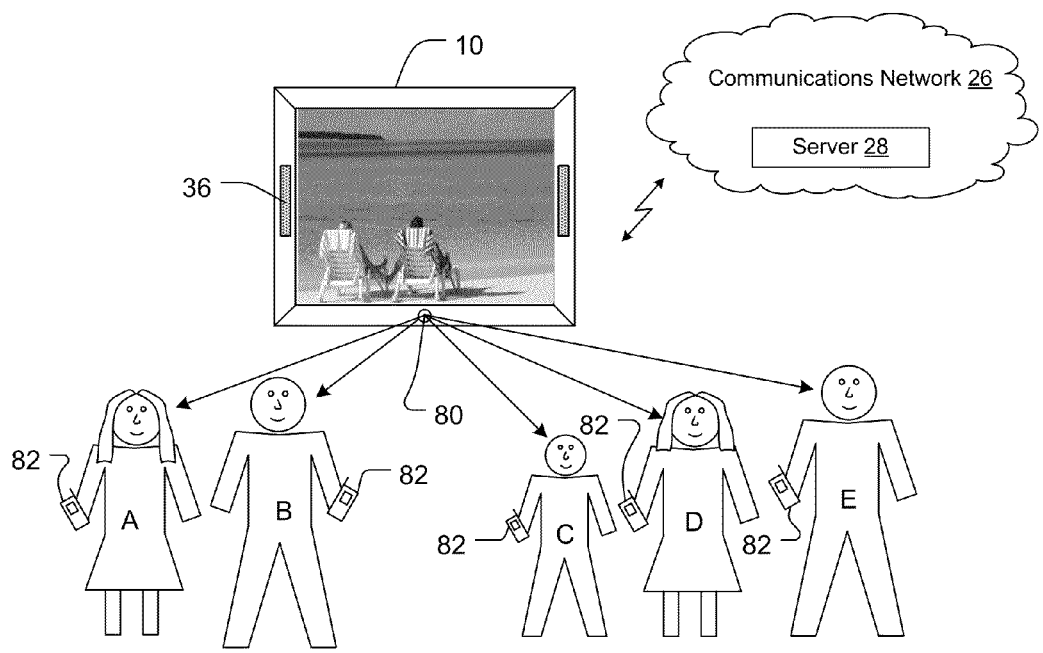
FIG. 3 is an exemplary environmental view of a media-reproduction device using facial recognition to identify at least one person in proximity to the media-reproduction device.
Figure 4:
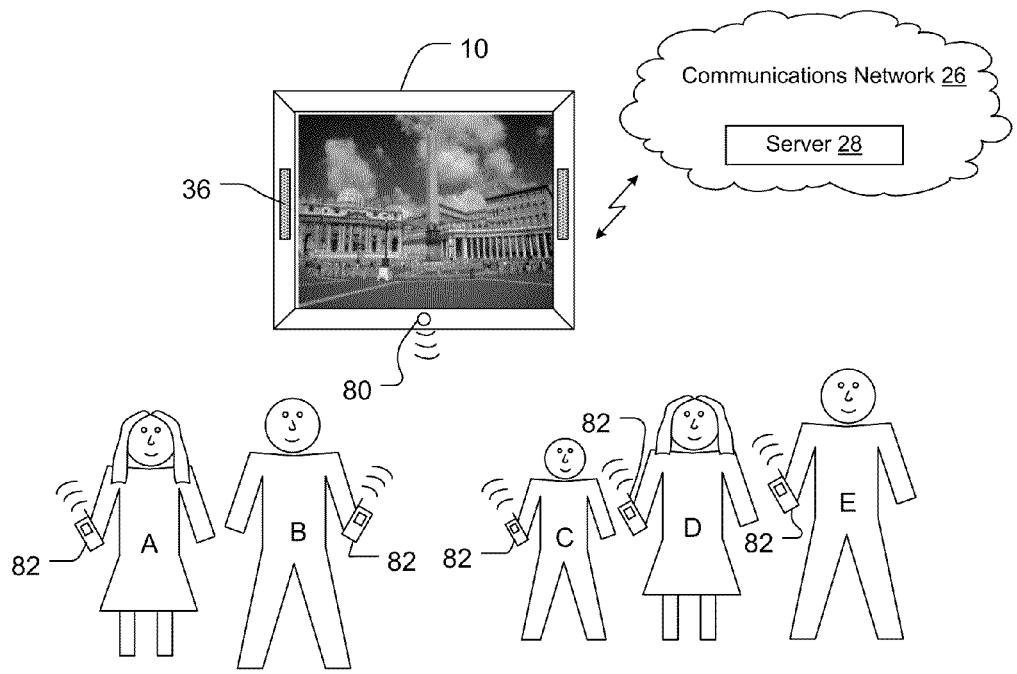
FIG. 4 is an exemplary environmental view of a media-reproduction device using a short-range radio module to identify at least one person in proximity to the media-reproduction device.
Figure 5:
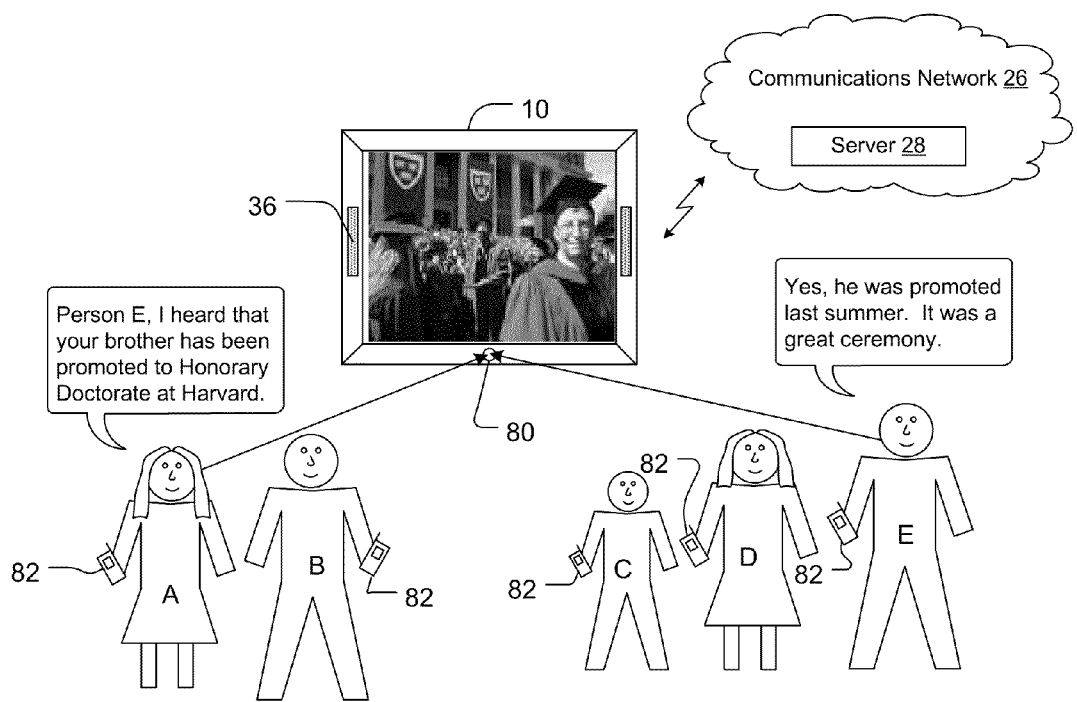
FIG. 5 is an exemplary environmental view of a media-reproduction device using audio recognition to identify at least one person in proximity to the media-reproduction device and/or for analysis of the social context.

In the present document, embodiments are described primarily in the context of a media-reproduction device, such as a mobile radio communication device (illustrated schematically in FIG. 1) or a digital photo frame (illustrated in FIGS. 3-5). It will be appreciated, however, that the exemplary context of the media-reproduction device as a mobile radio terminal or as a digital photo frame is not the only operational environment in which aspects of the disclosed systems and methods may be used. Therefore, the techniques described in this document may be applied to any type of appropriate electronic device, examples of which include a portable communication device, such as mobile telephone, a media player, a gaming device, a computer, a pager, a communicator, an electronic organizer, a personal digital assistant (PDA), a smartphone, a television, a display monitor, a projector, etc.

Figure 1:
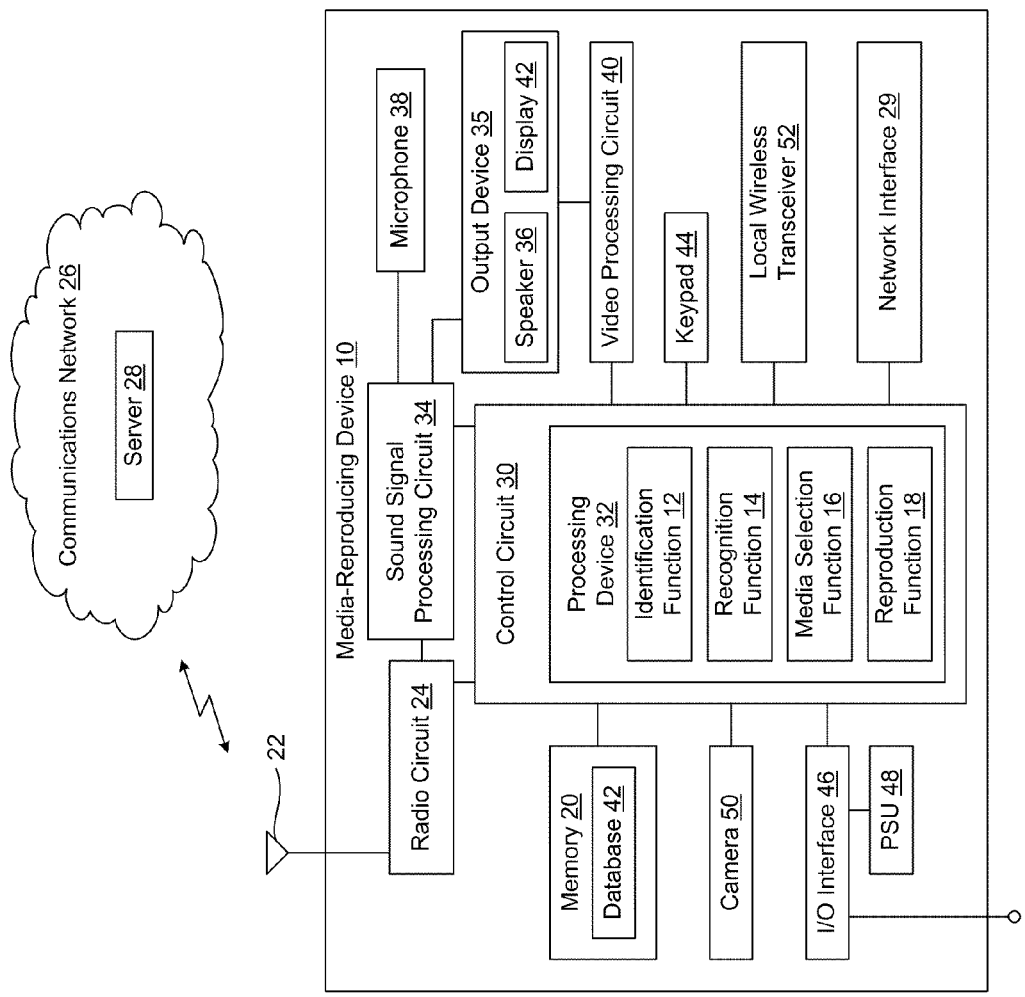
FIG. 1 is a schematic view of a media-reproduction device for adaptively reproducing media objects based upon social context.

Referring initially to FIG. 1, the media-reproduction device 10 includes an identification function 12 for identifying at least one person in proximity to the media-reproduction device. As described in more detail below, the identification function is configured to identify a person (or multiple people) by recognition of short-range radio device(s) (e.g., a Bluetooth device), and/or by a presence service available to the media-reproduction device via a network connection. The identification function 12 also can be configured to operate in conjunction with a recognition function 14 configured to identify people by facial recognition and/or voice recognition.

The identification function 12 also is configured to obtain and analyze social data related to each person in proximity to the media-reproduction device to determine social context. The social data may include, for example, social graphs and/or personal profile information related to each identified person. The social data may be stored in a local memory of the media-reproduction device or be retrieved from a remote source. Exemplary remote sources that may contain the social data include a remote database, a personal computer, and/or the internet. In one embodiment, the social data is obtained from social and/or professional networking websites, such as Facebook, LinkedIn, MySpace Flicker, Twitter, for example, or conventional search engines, such as Yahoo!, Google and the like.

The social context, which is determined based upon an analysis of the social data, constitutes the overall environment of the identified people, including, for example, interrelationships between each person identified in proximity to the media-reproduction device, common likes and dislikes, relationships, friends, etc. The social context is used by a media selection function 16 to determine which media objects are selected for reproduction.

The media selection function 16 is configured to select at least one media object for reproduction based upon the social context as determined by the analysis of the social data. The media objects can be identified by metadata or tags relating to the content of each media object. For example, the media objects can be tagged according to the people who are in the media object, the location in which the media object was produced, a description of the content of the media object, etc. As described in more detail below, the media selection function can be configured to search one or more database of media objects based upon the social context.

In an exemplary embodiment, the social context can be a social gathering including several friends (as determined by overlapping social data amongst the people in proximity to the media-reproduction device, for example), and the selected media objects can include digital photos in which any or all of the friends are tagged or photographs from a destination to which the friends have traveled. In another exemplary embodiment, the social context can be a business event (as determined by social data indicating that every person in proximity to the device shares the same employer or works in the same industry, for example), and the selected media objects may include digital photos, video and/or audio taken at another professional event in the same industry.

The selected media objects can be adapted based upon changes in the social context such as people entering or leaving the proximity of the media-reproduction device, changes in the mood of the people and/or changes in the surrounding environment, etc. For example, if the media-reproduction device detects the presence of two people who are friends in proximity (e.g., in the same room as the device), the social context can be determined to be an open context in which the media-reproduction device reproduces personal media objects (e.g., pictures of relatives, common friends, etc.). If another person enters the proximity of the media-reproduction device (e.g., by entering the room), the media-reproduction device can identify the person and adaptively select and reproduce media objects related to that person in addition to the media objects related to the two friends. Likewise, when one of the people leaves the proximity of the media-reproduction device (e.g., by leaving the room), the change in the social context will automatically be detected and the media-reproduction device will select and reproduce media objects related to the changed social context (e.g., media objects related to the people remaining in the room).

The media-reproduction device can be configured to apply restrictions when selecting the media objects. The restrictions can be in the form of general rules applied by the media-reproduction device when selecting the media objects, or in the form of user-defined rules, for example, rules that limit access to media objects. One example of such user-defined rules can be found on Facebook, wherein a user can filter or otherwise control who can view/access information related to the user based upon user relationships. For example, it is possible to limit access to information based upon whether a person seeking to view the information is a friend, a friend of a friend, or a stranger.

In the previous exemplary embodiment above, if the person enters the room is unrelated to the other people in the room (as can be determined from an analysis of the social data of each person), or if the person who enters the room cannot be identified, then the social context can be determined to be a limited social context and the media-reproduction device can automatically select and reproduce media objects that are less personal (e.g., pictures of only the people in proximity to the media-reproduction device or pictures of scenery, etc.). Once the unidentified person leaves the proximity of the device (e.g., by leaving the room), the device can automatically determine that the social context has changed again and accordingly select different media objects corresponding to new social context.

The media objects available for selection may be stored locally in the memory of the media-reproduction device or stored remote from the media-reproduction device. For example, the media objects can be obtained from Facebook, LinkedIn, MySpace Flicker, Twitter, Google or any other website in which media objects may be stored. Upon accessing the media objects, the media-reproduction device 10 can use the media selection function 16 to select those media objects that are relevant to the current social context.

The selected media objects can be transmitted to the media-reproduction device in a number of different manners, for example, the media objects be downloaded to the local memory of the media-reproduction device 10 from the remote source or streamed to the media-reproduction device from a personal computer and/or a server accessible to the media-reproduction device over an internet or other network connection.

The selected media objects are reproduced on the media-reproduction device by a reproduction function 18. The media objects can be reproduced on an output device of the media-reproduction device 10, which may include, for example, a display and/or one or more speakers, as described in more detail below. In the exemplary embodiment in which the media-reproduction device is a digital photo frame having audio and/or video output(s) (e.g., speakers and a display), the reproduction function is configured to output the selected media objects to the display screen and/or speakers thereby allowing people in proximity to the media-reproduction device to see and/or hear the selected media objects.

In the embodiment of FIG. 1, the media-reproduction device 10 is a portable communication device (e.g., a mobile phone) that includes communications circuitry that enables the device to establish communications with another device. Communications may include calls, data transfers, and the like. Calls may take any suitable form such as, but not limited to, voice calls and video calls. Data transfers may include, but are not limited to, receiving streaming content, downloading and/or uploading data, receiving or sending messages, and so forth. This data may be processed by the media-reproduction device 10, including storing the data in memory 20, executing applications to allow user interaction with the data, displaying video and/or image content associated with the data, outputting audio sounds associated with the data, and so forth. The memory 20 also may include a database 21 used to store identification information, social data, media objects, etc.

Although described above as a single media-reproduction device 10 including the identification function 12 and the reproduction function 18, it should be appreciated that the identifying and the reproducing can be handled by two different devices that are in communication with one another, for example, via a short-range radio communication connection, a network, the internet, etc., and that such communication between devices may occur via the network interface 29 and/or the I/O interface 46. For example, a portable communication device (e.g., a mobile phone) can be used for identification and retrieval of social data, and a digital photo frame can be used to select and reproduce the media objects based on the social context as determined from an analysis of the social data on the portable communication device. Additionally, it should be appreciated that the other functionality described as part of the media-reproduction device 10 can be accomplished on different devices as well. For example, the output device may be a display screen, such as a television with IP connectivity, that can be connected to an IP (Internet Protocol) network and the media objects can be streamed over the IP network to the display screen.

In the exemplary embodiment, the communications circuitry may include an antenna 22 coupled to the radio circuit 24. The radio circuit 24 may include a radio frequency transmitter and receiver for transmitting and receiving signals via the antenna 22. The radio circuit 24 may be configured to operate in a mobile communications system. Radio circuit 24 types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMAX, integrated services digital broadcasting (ISDB), and/or high speed packet access (HSPA), as well as advanced versions of these standards or any other appropriate standard. It will be appreciated that the media-reproduction device 10 may be capable of communicating using more than one standard. Therefore, the antenna 22 and the radio circuit 24 may represent one or more than one radio transceiver.

The media-reproduction device 10 may communicate with a communications network 26 that has a server 28 (or servers) for managing calls placed by and destined to the media-reproduction device 10, transmitting data to and receiving data from the media-reproduction device 10 and carrying out any other support functions. The media-reproduction device 10 communicates with the network 26 via a transmission medium. The transmission medium may be any appropriate device or assembly, including, for example, a communications base station (e.g., a cellular service tower, or "cell" tower), a wireless access point, a satellite, etc. The network 26 may support the communications activity of multiple media-reproduction devices and other types of end user devices. As will be appreciated, the server 28 may be configured as a typical computer system used to carry out server functions and may include a processor configured to execute software containing logical instructions that embody the functions of the server 28 and a memory to store such software. In alternative arrangements, the media-reproduction device 10 may wirelessly communicate directly with another electronic device (e.g., another media-reproduction device, a mobile telephone, a computer, etc.) through a local network or without an intervening network.

Although illustrated as a connection to the network 26 via antenna 22 and radio circuit 24, it will be appreciated that the media-reproduction device can include a network interface 29 for providing a connection to the internet in another manner. The connection to the internet can be a wireless connection, a wired connection, a connection to the phone network, or a satellite connection, etc.

The media-reproduction device 10 may include a primary control circuit 30 that is configured to carry out overall control of the functions and operations of the media-reproduction device 10. The primary control circuit 30 includes a processing device 32 such as a central processing unit (CPU), a microcontroller or a microprocessor, for example. The processing device 32 executes code stored in a memory (not shown) within the control circuit 30 and/or in a separate memory, such as the memory 20, in order to carry out operation of the media-reproduction device 10. For instance, the memory within the control circuit 30 and/or the memory 20 may store executable code that embodies the identification function 12, the recognition function 14, the media selection function 16 and the reproduction function 18, and the processing device 32 may execute that code so that the control circuit 30 is configured to implement the various functions.

The identification function 12, recognition function 14, media selection function 16 and reproduction function 18 may be embodied as executable instructions (e.g., code) that are resident in and executed by the electronic device 10. In one embodiment, the functions 12, 14, 16 and 18 may be one or more programs that are stored on a computer or machine readable medium. The functions 12, 14, 16 and 18 may be stand-alone software applications or form a part of software applications that carry out additional tasks related to the electronic device 10.

Also, through the following description, exemplary techniques for the identification function 12, reproduction function 14, media selection function 16 and reproduction function 18 are described. It will be appreciated that through the description of the exemplary techniques, a description of steps that may be carried out in part by executing software is described. A computer program listing is omitted for the sake of brevity. However, the described steps may be considered a method that the corresponding device is configured to carry out.

The memory 20 may be, for example, one or more of a buffer, a flash memory, a hard drive, a removable media, a volatile memory, a non-volatile memory, a random access memory (RAM), or other suitable device. In a typical arrangement, the memory 20 may include a non-volatile memory for long term data storage and a volatile memory that functions as system memory for the control circuit 30. The memory 20 may exchange data with the control circuit 30 over a data bus. Accompanying control lines and an address bus between the memory 20 and the control circuit 30 also may be present.

The media-reproduction device 10 further includes a sound signal processing circuit 34 for processing audio signals transmitted by and received from the radio circuit and/or audio from media objects. Coupled to the sound processing circuit 34 can be the output device 35 for reproducing a media object, which may include the speaker 36, and the microphone 38 to enable a user to listen and speak via the media-reproduction device 10. The radio circuit 24 and sound processing circuit 34 are each coupled to the control circuit 30 so as to carry out overall operation. Audio data may be passed from the control circuit 30 to the sound signal processing circuit 34 for playback to the user. The sound processing circuit 34 may include any appropriate buffers, encoders, decoders, amplifiers and so forth.

The output device 35 also may include the display 42, which may be coupled to the control circuit 30 by a video processing circuit 40 that converts video data to a video signal used to drive the display 42. The video processing circuit 40 may include any appropriate buffers, decoders, video data processors and so forth. The video processing circuit also can be configured to display media objects on a display 42, such as digital photographs, video files, slideshows and the like. In addition to media objects, the display 42 displays information, video, graphics, menus, internet content, and graphical interfaces to the user.

The media-reproduction device also may include a keypad 44 to provide for a variety of user input operations. For example, the keypad 44 may include alphanumeric keys, special function keys, navigation and select keys, and so forth. A navigation input device also may be present. Input functionality also may be embodied as a touch screen associated with the display 42. Also, the display 42 and keypad 44 may be used in conjunction with one another to implement soft key functionality.

The media-reproduction device 10 may further include one or more input/output (I/O) interface(s) 46. The I/O interface(s) may be in the form of typical mobile telephone I/O interfaces and may include one or more electrical connectors. The I/O interfaces may form one or more data ports for connecting the media-reproduction device 10 to another device (e.g., a computer) or an accessory (e.g., a personal handsfree (PHF) device) via a cable. Further, operating power may be received over the I/O interface(s) and power to charge a battery of a power supply unit (PSU) 48 within the media-reproduction device 10 may be received over the I/O interface(s). The PSU may supply power to operate the media-reproduction device 10 in the absence of an external power source.

The media-reproduction device 10 also may include various other components. For instance, a camera 50 may be present for taking digital pictures and/or movies. Image and/or video files corresponding to the pictures and/or movies may be stored in the memory 20. A local transceiver 52, such as an RF transceiver (e.g., a Bluetooth chipset) may be present to establish communication with a nearby device, such as an accessory, another mobile radio terminal, a computer or another device.

With additional reference to FIG. 2, illustrated are logical operations to implement an exemplary method of adaptively reproducing media objects on the media-reproduction device 10. The exemplary method may be carried out by executing an embodiment of the identification function 12, reproduction function 14, media selection function 16 and reproduction function 18, for example. Thus, the flow chart of FIG. 2 may be thought of as depicting steps of a method carried out by the electronic device 10. Although FIG. 2 shows a specific order of executing functional logic blocks, the order of executing the blocks may be changed relative to the order shown. Also, two or more blocks shown in succession may be executed concurrently or with partial concurrence. Certain blocks also may be omitted.

In one embodiment, the logical operations of FIG. 2 are carried out on a continual basis such that the media-reproduction device 10 can detect a change in the social context when it happens, for example, when a person enters or leaves the vicinity of the media-reproduction device, a new topic of conversation arises, the mood of the people changes, etc.

The logical flow for the adaptively reproducing a media object may begin in block 70 in which the media-reproduction device is configured to use the identification function 12 to identify at least one person in proximity to the media-reproduction device. As described above, the identification function 12 can be run in conjunction with the recognition function 14 to identify any people in proximity to the media-reproduction device by facial recognition and/or voice recognition.

As mentioned above, the media-reproduction device 10 can have a camera 50. The camera can be used to obtain an image each person in proximity to the media-reproduction device. The image can then be processed by facial recognition techniques to determine the identity of the people in the image. Conversely, it also can be determined if the identity of the person cannot be ascertained. The facial recognition techniques can be performed on the media-reproduction device with the recognition software, or the media-reproduction device can interface with a remote device for the facial recognition processing.

For example, the user of the media-reproduction device 10 may have an account on a social networking website such as Facebook. The user's Facebook profile can be loaded onto the media-reproduction device, or may be accessible to the media-reproduction device a connection to the internet through the network interface 29. The user's Facebook profile may include images of the user and the user's friends and acquaintances. The recognition function can be used to compare the image obtained by the camera 50 to the images of the user's Facebook friends to make a determination by facial recognition of whether the image from the camera 50 includes any of the user's friends, and if so, the name of the person.

In another embodiment, the facial recognition can be accomplished on a remote server, for example, by obtaining an image of the people in proximity to the media-reproduction device and comparing the image to photographs in a database stored on the remote database for a determination of the identity of the people in proximity to the device.

The people in proximity to the media-reproduction device also can be identified manually. For example, via the display 42 and keypad 44, a user of the media-reproduction device 10 can manually enter identification information (e.g. names) of people in proximity to the device and/or tag images of the people in proximity to the device, for example, by tagging images obtained via the camera 50 and/or by tagging images of the people on websites that are accessible to the media-reproduction device.

The people in proximity to the media-reproduction device 10 also can be identified by audio recognition techniques. For example, audio from the environment surrounding the media-reproduction device can be obtained via the microphone 38. The audio may include voice data from people in proximity to the media-reproduction device, and the voice data can be compared to voices of known individuals to determine the identity of the people whose voices have been captured. As with the facial recognition identification, voice recognition processing can be performed either on the media-reproduction device or through a remote application accessible to the media-reproduction device, for example, via the internet.

Identification of the people in proximity to the media-reproduction device 10 also can be achieved by detecting the presence of short-range radio communication devices (e.g., Bluetooth devices) in proximity to the media-reproduction device 10. For example, short-range radio devices can be detected by a short-range radio module configured to scan for short range radio devices, such as the local wireless transceiver 52 illustrated in FIG. 1. Upon detection of a short-range communication device, the devices may exchange identifying information that allows the media-reproduction device to determine the identity of the person operating the short-range communication device. The identification can include, for example, the name of the person that owns the portable communication device and/or other identifying information such as the phone number of the portable communication device.

The name and/or other identifying information can be compared to a contact list, which may be stored in the memory 20 of the media-reproduction device 10 or stored remotely on a website. The recognition function 14 can be used to make a determination as to whether the owner of the short-range communication device is known to user. Alternatively, the recognition function can be used to determine the identity of the portable communication device, for example, by comparison to a database such as a reverse phone number lookup database available via an internet connection and/or by a comparison of the identifying information to a database on a social or professional networking website, etc.

The identity of the people in proximity to the media-reproduction device 10 also can be determined by examining the current location of the person as may be provided by a presence service. For example, a person that is a contact of the owner of the media-reproduction device may provide location-based updates with a presence service, and the location-based update can be used by the media-reproduction device to determine if the person is in proximity (or is planning to be in proximity) to the media-reproduction device. For example, a contact may update his presence information to indicate that he is going to be at the house of the owner of the media-reproduction device, and by monitoring the presence information of the contact, the recognition function can determine the identity of the person who is in proximity to the media-reproduction device. Likewise, if a contact changes his presence state to reflect a different state, then the media-reproduction device can determine that the identity of the people in proximity has changed (e.g., the contact has left the proximity of the media-reproduction device). The presence information of people related to the owner, for example, as may be determined from a social graph (also known as a social network), also may be monitored to determine the identity of a person in proximity to the device. The social graph may include an image of the person's social network and/or a data structure representative of the person's social network.

Each person in proximity to the media-reproduction device 10 can have social data associated with their identity. The social data can include user profiles, social graphs, access rights and social objects (photos, videos, text). For example, social data can include information related to the person, such as name, contact information, hobbies, interests, likes and dislikes, employment information, friend lists, ethnic background, mood information (happy, sad, angry, etc.), places the person has visited, etc. The social data may be stored within the memory 20 of the media-reproduction device 10 and/or obtained from or accessed on a remote source, for example, Facebook, LinkedIn, Twitter, MySpace, Flicker, Picasa, Google, etc.

The social data also can contain information regarding restrictions or limitation as to who is authorized to view certain media objects, and by analyzing who is authorized to see the media objects of each identified person, it is possible to define a common policy that fits all people in the social context. Thereby reproduction of media objects that are sensitive from a privacy point of view can be avoided. Consequently, the media selection can vary depending on the member of the social context (e.g., lover, family, friends, and/or stranger/unidentified), and based upon the presence of strangers.

Additionally, different levels of authorization (e.g., privacy settings) can be set by each person, for example, by setting restrictions related to media objects available for selection. In one embodiment, the media-reproduction device can use restrictions placed on media object by users of websites such as Facebook, Picasa, Google, and/or other social and/or professional networking websites. The restrictions may limit which media objects are available for selection based upon the identity and relationships of the people in proximity to the media-reproduction device. Thus, highly personal media objects can be available for selection if the identified people are lovers, but less personal media objects can be selected if a stranger/unidentified person enters the proximity of the media-reproduction device. People also can customize the restrictions so as to control which media objects can be selected when particular people are present. For example, certain categories of media objects can be marked so as to only be available for selection when friends are identified in proximity to the media-reproduction device, while other categories of media objects can be marked so as to be available when non-friends are in proximity to the media-reproduction device.

In block 72, the social context within proximity to the media-reproduction device 10 is determined. The social context can be determined based upon an analysis of the social data corresponding to the people identified in proximity to the media-reproduction device. The analysis of the social data and corresponding determination of the social context can be performed as part of the identification function 12.

The determination of the social context can include, for example, an evaluation of the social graphs of the people identified in proximity to the media-reproduction device 10 to determine if the people have anything in common. For example, the analysis can include a determination of whether the people are friends or strangers, and/or if the people have any friends in common. The analysis also can include an evaluation of whether or not any of the social data from one person overlaps with the social data of another person. For example, the social data of one person may indicate that the person likes to play soccer, while the social data of another person may indicate a favorite soccer team. In such a circumstance, the social context can be determined to be related to sports and in particular, soccer and/or a specified soccer team.

The social context can be determined based upon the relationships that the people in proximity have with one another. For example the social context can be determined to be a business context if the people in proximity to the media-reproduction device share a common employer and/or if it is determined that the people have a business relationship with one another. To reduce the risk that people just passing by the media-reproduction device are considered a part of the social context, the social graphs of the identified people can be examined and the social context can be restricted to only include those people that have some kind of relation to one another (e.g., friends, relatives, etc.).

Social data also can be used to determine social context based upon the mood of the people identified in proximity to the media-reproduction device 10. For example, the mood of the identified people can be evaluated with the recognition function, and based upon intonation, inflections and/or other characteristics. The nature of the speech can be determined and correlated to the mood of the identified people. For example, abrasive noises may indicate that people are angry or fighting while silence may indicate that the identified people do not have anything to talk about or that the people are shy.

The system can also sense the current social context by sensing audio from the surrounding environment within proximity to the media-reproduction device 10 through the microphone 38. The audio can include a conversation between people in proximity to the media-reproduction device 10 and the media-reproduction device can be configured, through the recognition function 14, to extract keywords from the conversations. The keywords can be extracted from the conversations by voice recognition, for example, as part of the recognition function 14. The extracted keywords may concern the names of locations (e.g., Rome, Sweden) or subjects (e.g., pyramids, soccer, sports) and the social context can be determined to be a conversation concerning the keywords.

The social data also can include gestures of the people in proximity to the device that can be detected by the camera 50. The gestures can be analyzed by the recognition function 14 to add more information to the social context. For example, the gestures may include dancing movements, in which case the social context could be determined to be a dance or party. In another example, the gestures can include violent movements, such as may occur if people are fighting or arguing.

Referring now to block 74, one or more media objects are selected for reproduction by the media selection function 16 of the media-reproduction device 10. Media objects, such as digital photos, videos and/or audio files, etc., can be tagged with metadata. The metadata can be added manually by a user through offline data entry methods or the metadata can be added to the media object automatically. For example, metadata can be automatically embedded into digital photograph files by the camera. The metadata can include, for example, time and location of the photograph, subject matter, people in the picture, etc. Additionally or alternatively, a user can manually add metadata to the digital photograph, for example, by tagging individuals in the picture, adding keywords, etc. The metadata also can be added through use of an application that uses facial recognition or other recognition techniques to identify the people and/or other content of the media object. The metadata also typically contains information about people that are in the pictures.

The media objects can be selected from media objects stored on the media-reproduction device 10, for example, in memory 20. Additionally or alternatively, the media objects can be selected from media objects stored on a remote server, for example, a server associated with a particular website. The media objects also could be selected from a media objects stored on the portable communication devices of those people in proximity to the media-reproduction device and may be obtained directly from the other devices via a short-range wireless connection or via another connection to the devices.

Selections of which media that are reproduced on the media-reproduction device 10 can be based on the information that is available in the social data. For example, media objects can be selected based upon media taken from the same geographical locations to which the people in proximity have traveled. The geographical locations can be determined from overlap of metadata associated with media objects of each person. For example, if both person A and person B have media objects that are tagged as being taken from Egypt, then all of the media objects related to Egypt can be selected. Likewise, all media objects concerning Egypt can be selected if person A is speaking about Egypt and person B has visited Egypt, or if person A has media objects related to pyramids and person B has media objects related to the Sphinx.

The media objects also may be selected based upon the identity of the people in proximity to the media-reproduction device. For example, if person A and person B are identified as being in proximity to the media-reproduction device, then all of the media objects that are associated with person A and person B by metadata can be selected. Alternatively, all media objects including person A and person B as content can be selected, for example, all digital photos and/or videos in which either person A or person B appears. In yet another alternative, only those media objects that include both person A and person B can be selected, or only those media objects that include person A without person B (and vice versa) are selected. The selected media objects also may be filtered based upon person A's relationship with person B.

The media objects also may be selected based upon common hobbies of the people in proximity to the media-reproduction device. For example, the social data of each person can include a particular hobby that each person enjoys. The social context can include the hobby that the people have in common, and media objects relating to the common hobby can be selected by the media selection function. For example, if person A and person B both like woodworking, then media objects concerning each person's woodworking projects can be selected. In another example, both person A and person B may share a common sport hobby, such as fishing, and therefore media objects concerning fishing can be selected.

In another example, the media objects can include media related to the same ethnic background of the people in proximity to the media-reproduction device. For example, person A and person B may be Swedish and therefore media objects related to Sweden, for example, landmarks in Sweden, pictures of Sweden, etc., can be selected.

The media objects also may be selected based upon gestures or the mood (e.g., angry, happy, in love) of the people in proximity to the media-reproduction device. For example, if the social context is one in which the people are angry, the media objects can be selected to include soothing or relaxing media objects, or media objects that are humorous can be selected. If the mood of the people is determined to be happy, then humorous material can be selected. If the mood of the people is determined to be in love, then romantic media objects can be selected (e.g., romantic music).

The selection of media objects also can be based on a topic of conversation detected as part of the social context. The topic of conversation can be determined based upon the detection of keywords as part of the conversation of the people in proximity to the media-reproduction device, and the media objects may be selected based upon the identified keywords. Thus, the people in proximity to the media-reproduction device can, in effect, control the social context to thereby control the media objects selected for reproduction. For example, the people in proximity to the device can use keywords related to the media objects that they would like to have reproduced so as to cause the media-reproduction device to select media objects related to that keyword.

The media objects can be selected to enhance the social context, for example, by playing music when the social context is determined to be a party, and by reproducing humorous or soothing media objects if the social context is determined to include angry people. The media objects also may be selected to stimulate new topics of conversation, for example, when the social context is determined to be quiet. In one embodiment, the selected media objects may include media objects to stimulate conversation, for example, by including media objects that the people in proximity do not have in common with one another.

The selected media objects may be person A's or person B's media objects, or may be from a different source such as a friend of one of the people or another source. The selected media objects can include one or more digital photo files, video files, and/or audio files, etc.

The social context and resulting selection of media objects can therefore be used to enhance or exploit the ongoing discussions. For example, the discussion could be enhanced by changing the selection of media to match the ongoing conversation and present people interests, location history, shared media etc. The social context can also be used to stimulate new conversation topics by negating one or more aspects, for example, by selecting media objects that match the location history of the people in proximity to the media-reproduction device, but only media shared by friends not present and interests that do not match with the interests of more than one present person.

In block 76, the selected media objects are reproduced on the output device 35 (e.g., the speaker 36 and/or display 42) of the media-reproduction device 10. Thus, when the selected media objects are digital photos, the photos can be displayed on the display, for example, as a slideshow. When the selected media objects are audio files, then the audio can be played through the speaker. If the selected media objects are video files, then the video can be displayed on the display and the audio can be reproduced through the speakers. The media objects also may be a combination of audio, digital photo and/or video files.

Referring now to FIGS. 3-5, several exemplary environments of the media-reproduction device are shown with people A-E in proximity to the media-reproduction device 10, with the media-reproduction device 10 in the form of a digital photo frame that includes the functionality described above, including the identification function 12, the recognition function 14, the media selection function 16, and the reproduction function 18. In the exemplary embodiment where the media-reproduction device is a digital photo frame, it may not be necessary to have all of the features described above with respect to FIG. 1, including, for example, an antenna 22 and radio circuit 24, although such components may be included if so desired.

Each person in proximity to the media-reproduction device 10 may have a portable communication device 82. The portable communication devices also may be media-reproduction devices and therefore may include the same functionality described above with respect to FIG. 1.

In the examples of FIGS. 3-5, it is assumed that people A and B are members of one family and people C, D, and E are members of another family. The social context can be a dinner party, for example, with people A and B inviting people C, D, and E to their house where a media-reproduction device 10 is hung on the wall. Although FIGS. 3-5 illustrate the media-reproduction device on the wall, it will be appreciated that only the output device 35 (e.g., a television) may be mounted on the wall and the media objects may be streamed to the output device from other devices (e.g., other mobile devices, a personal computer, etc.) via an internet or another network connection.

In FIG. 3, the media-reproduction device 10 is shown in the form of a digital photo frame having speakers 36 and a sensor 80. The sensor 80 may include the microphone 38 and/or the camera 40, as described above. Additionally, the sensor 80 also is representative of the short-range radio module (e.g., local wireless transceiver 52) for detecting and establishing short-range wireless communication connections with the other devices 82.

In the environment of FIG. 3, the sensor 80 functions as a camera. The camera can obtain images of the people A-E in proximity to the device 10. As described above, the people can be identified by a recognition function 14, for example, by facial recognition. After identifying the people, the media-reproduction device 10 can determine the social context from social data corresponding to each identified person. For example, the social data can indicate that people A and B are family members and that people C-E are family members. Additionally, an analysis of the social data from all of the people A-E can indicate overlapping friendships amongst all of the people in proximity to the media-reproduction device 10. The social context can therefore be determined to be an open social context including friends and family members.

Accordingly, the media objects selected for display can include, for example, digital photographs of any or of the people A-E together with one another, videos showing any or all of the people A-E, and/or variations thereof. In the exemplary environment of FIG. 3, the selected and reproduced media object can be image of people A and B that was taken while on vacation. Alternatively, the image can be of a common destination to which all of the people A-E have travelled to in the past. Although only a single image is shown, it will be appreciated that a plurality of images and/or other media objects can be reproduced on the media-reproduction device, for example, as part of slideshow or other reproduction of media objects.

As described above, the images can be obtained from the communications network, the internet, the other devices 82 and/or the local memory of the media-reproduction device 10.

Referring to FIG. 4, an embodiment of the media-reproduction device 10 is shown in which the people A-E are identified by their respective portable communication devices 82. For example, one or more of the portable communication devices may include short-range radio communication functionality to establish a short-range communication connection (e.g., a Bluetooth connection) between the devices 82 and the media-reproduction device 10 as well as between the respective devices carried by each person A-E. Thus, by sensing the Bluetooth devices 82, the media-reproduction device can determine the identity of the owners (e.g., people A-E) of the devices 82, as described above.

In the example of FIG. 4, a photo of St. Peter's Basilica in Rome is selected and displayed on the media-reproduction device 10. The photo may be selected based on the social context and corresponding social data. For example, assume for the example of FIG. 4 that people A and B travelled to Rome in 2007 and that they have a number of pictures stored on their respective devices 82 from the trip. The social data for person A and person B can include information regarding destinations to which they have travelled in the past and the images from the trip can be tagged with metadata indicating the various places and landmarks that they visited in Rome. Assume also that the social data for person D indicates that she is a member of the Catholic Church.

Based upon an analysis of the social data for people A, B and D, it can be determined by the media-reproduction device 10 (or the mobile devices 82) that the social context of the environment of FIG. 4 includes overlapping social data related to the Catholic Church (e.g., people A and B have been to Rome and the head of the Catholic Church, which E is a part of, is in Rome). Accordingly, media objects that include metadata indicating that the objects were taken in Rome and/or are related to the Catholic Church can be selected for reproduction on the media-reproduction device. If stored in a local memory of person A's and/or person B's devices 82, the images can be transferred or streamed to the media-reproduction device 10 via the short-range communication devices, streamed over an internet connection, downloaded to the local memory of the media-reproduction device 10, or transferred in another way. The selected images also may be available by connecting to person A's and/or person B's Facebook profile or another website that may contain such image data.

Referring now to FIG. 5, the sensor 80 is configured as a microphone to detect audio surrounding the media-reproduction device 10. As described above, the media-reproduction device can include a recognition function 14 to recognize keywords from the sensed audio. In the embodiment of FIG. 5, person A is discussing a topic of conversation that includes a statement regarding a promotion that a relative of person E received at Harvard. The recognition function can recognize keywords from the dialog between person A and person E, such as "Harvard," "brother," and "ceremony" for example.

The media-reproduction device can then search the metadata of the media objects using the identified keywords. The media-reproduction device may search the media objects of each person A-E in proximity to the media-reproduction device and/or the media objects of all relatives to person E to identify and select media objects related to the event and then to reproduce the selected media objects on the media-reproduction device. For example, photos from the event can be reproduced along with video and/or audio content from a keynote speaker at the event.

Although multiple people A-E are shown in proximity to the media-reproduction device of FIGS. 3-5, other scenarios are possible, for example, the determination of the social context also may include a determination that only a single person is in proximity to the media-reproduction device. The media objects selected for reproduction by the media selection function can be all media objects related to the identified person without any restriction on what is displayed.

As will be appreciated, the exemplary social contexts of FIGS. 3-5 may change or vary over time. For example, during the course of an evening the social context may change amongst the exemplary social contexts of FIGS. 3-5. Thus, in an embodiment, the device may change from reproducing media objects related to a vacation taken by people A and B, to media objects related to the Catholic Church, to media objects related to a social event, without any manual configuration or intervention by a person. Accordingly, the media-reproduction device described herein can adapt to reproduce media objects that are related to the current social context and to vary the reproduced media objects as the social context changes, thereby reproducing media objects that remain relevant to the people that are most likely to see them.

Although certain embodiments have been shown and described, it is understood that equivalents and modifications falling within the scope of the appended claims will occur to others who are skilled in the art upon the reading and understanding of this specification.

What is claimed is:

1. A media-reproduction device for adaptively reproducing media objects based upon social context within proximity to the media-reproduction device comprising:
    an output device for reproducing a media object; and
    a control circuit configured to:
        identify a person in proximity to the media-reproduction device;
        identify at least one additional person in proximity to the media-reproduction device;
        determine a social context based upon an analysis of social data corresponding to the identified person, social data corresponding to each of the at least one additional identified persons, and a surrounding environment in proximity to the media-reproduction device, wherein:
            the social data is received from a social and/or professional networking website;
            the social data identifies a relationship between the identified person and each of the at least one additional identified persons, the relationship specifying at least an existence of a preexisting relationship or a lack of a preexisting relationship; and
            the social context is determined based on the identified relationship between the identified person and each of the at least one additional identified persons, such that:
                if the identified relationship specifies the existence of a preexisting relationship between the identified person and each of the at least one additional identified persons, then at least one media object is selected for reproduction on the output device from an account at the social and/or professional networking website of the identified person or one of the at least one additional identified persons;
                if the identified relationship specifies the lack of a preexisting relationship between the identified person and at least one of the additional identified persons, then at least one media object is selected for reproduction on the output device that is not from the account at the social and/or professional networking website of the identified person or any of the at least one additional identified persons;
        reproduce the at least one media object on the output device, and
    the media-reproduction device comprising a mobile phone having a display, the output device comprising the display of the mobile phone, and the control circuit is configured to identify at least one additional person in proximity to the media-reproduction device via information received from a mobile phone of the at least one additional person.

2. The media-reproduction device of claim 1, wherein the at least one media object is selected based upon social data that the identified people have in common with each other.

3. The media-reproduction device of claim 1, wherein the at least one media object is selected based upon social data that the identified people do not have in common with each other.

4. The media-reproduction device of claim 1, further comprising a camera and a recognition function for processing an image obtained by the camera, wherein the control circuit is configured to identify the person in proximity to the media-reproduction device by facial recognition.

5. The media-reproduction device of claim 1, further comprising a microphone for detecting audio in proximity to the media-rendering device, wherein the determination of the social context is additionally based upon the detected audio.

6. The media-reproduction device of claim 5, wherein the audio includes vocal content from the person in proximity to the media-rendering device, and
    wherein the recognition function processes the vocal content to identify the at least one person in proximity to the media-reproduction device by voice recognition.

7. The media-reproduction device of claim 1, wherein the mobile phone comprises a short-range radio module configured to scan for short range radio devices,
    wherein the control circuit identifies the person in proximity to the media-reproduction device by detecting a short range radio device associated with the person.

8. The media-reproduction device of claim 1, further comprising an interface for communication with a remote source to obtain the social data related to the person in proximity to the media-rendering device.

9. The media-reproduction device of claim 8, wherein the person in proximity to the media-reproduction device is identified from a presence service accessible to the media-reproduction device via an internet connection through the interface.

10. The media-reproduction device of claim 1, wherein the social data includes a corresponding profile for each identified person, the profile including restrictions regarding the media objects available for reproduction on the media-reproduction device based upon the social context.

11. The media-reproduction device of claim 1, wherein the control circuit is configured to adapt the social context based upon changes in the social data.

12. The media-reproduction device of claim 1, wherein the social context includes a determination of a mood of the identified person, and the media object is selected based upon the mood.

13. The media-reproduction device of claim 1, wherein the control circuit is configured to select the at least one media object by searching a source of media objects for media objects that are related to the determined social context.

14. The media-reproduction device of claim 1, wherein the control circuit is configured to select at least one additional media object for reproduction based upon the determined social context, and to reproduce the selected media objects on the output device.

15. The media-reproduction device of claim 1, wherein the social context comprises at least one or more of interrelationships between each person identified, common likes and dislikes, relationships, common hobbies, ethnic background and/or friends.

16. A method of adaptively reproducing media objects on a media-reproduction device comprising:
   identifying a person in proximity to the media-reproduction device;
   identifying at least one additional person in proximity to the media-reproduction device;
   determining a social context based upon the analysis of social data corresponding to the identified person, social data corresponding to each of the at least one additional identified persons, and a surrounding environment in proximity to the media-reproduction device, wherein:
      the social data is received from a social and/or professional networking website;
      the social data identifies a relationship between the identified person and each of the at least one additional identified persons, the relationship specifying at least an existence of a preexisting relationship or a lack of a preexisting relationship; and
      the social context is determined based on the identified relationship between the identified person and each of the at least one additional identified persons, such that:
         if the identified relationship specifies the existence of a preexisting relationship between the identified person and each of the at least one additional identified persons, then at least one media object is selected for reproduction on an output device from an account at the social and/or professional networking website of the identified person or one of the at least one additional identified persons;
         if the identified relationship specifies the lack of a preexisting relationship between the identified person and at least one of the additional identified persons, then at least one media object is selected for reproduction on the output device that is not from the account at the social and/or professional networking website of the identified person or any of the at least one additional identified persons;
   reproducing the at least one media object on the output device,
   wherein the media-reproduction device comprises a mobile phone having a display, the output device comprises the display of the mobile phone, and
   wherein said identifying at least one additional person in proximity to the media-reproduction device comprises receiving information from a mobile phone of the at least one additional person.

17. The method of claim 16, further comprising determining whether the social context has changed, and adapting the selection of at least one media object based upon the change in the social context.

* * * * *